Jensen et al.

[11] 3,729,634
[45] Apr. 24, 1973

[54] AUTOMATIC BEAM RATIO CONTROL SYSTEM FOR HOLOGRAPHY

[75] Inventors: Niels Jensen, Los Angeles; James T. Thomasson, Sunland; Donald C. Mead, Granada Hills, all of Calif.

[73] Assignee: Recognition Systems, Inc., Van Nuys, Calif.

[22] Filed: Sept. 20, 1971

[21] Appl. No.: 181,867

[52] U.S. Cl. ............... 250/204, 350/3.5, 350/162 SF
[51] Int. Cl. ........................ G02b 27/00, G01j 1/36
[58] Field of Search .................. 350/3.5, 162 SF; 250/201, 204, 205; 95/10 R, 10 CT; 356/106 R, 109

[56] References Cited

UNITED STATES PATENTS

| | | | |
|---|---|---|---|
| 3,353,462 | 11/1967 | Suzuki | 95/10 |
| 3,572,882 | 3/1971 | Neumann | 350/3.5 |
| 3,612,698 | 10/1971 | Mathisen | 350/3.5 |

OTHER PUBLICATIONS

Friesem et al., Applied Optics, Vol. 6, No. 5, May 1967 pp. 851–856
Kasper et al., Jour. of the Optical Society of America, Vol. 58, No. 7, July 1968 pp. 970–976

*Primary Examiner*—Ronald L. Wibert
*Assistant Examiner*—Ronald J. Stern
*Attorney*—Alan C. Rose et al.

[57] ABSTRACT

This invention comprises apparatus for controlling the ratio of the signal and reference beams in a system for making holographic filters for use in matched filter pattern recognition apparatus. Means is provided for measuring the intensity of the spatial frequencies of a signal beam, and means is provided for measuring the intensity of a reference beam. The difference between the measured beam ratio and the optimum beam ratio controls an attenuator placed in either the reference beam path or the signal beam path. A shutter may also be controlled so that uniformity of exposure is maintained as the beam ratio is adjusted.

1 Claim, 5 Drawing Figures

AUTOMATIC BEAM RATIO CONTROL SYSTEM FOR HOLOGRAPHY

The invention relates to holographic filters for use in matched filter pattern recognition systems. More particularly, it relates to apparatus for maintaining a predetermined ratio of signal to reference beam intensities during the making of a plurality of holographic filters.

The basic principles of holography are disclosed in an article entitled "A New Microscope Principle" by D. Gabor, published in NATURE, Vol. 161, page 777 (May 15, 1948). A subsequent survey of this field appears in "Some Current Views On Holography" by R. J. Collier, published in IEEE SPECTRUM, Vol. 3, page 67, July, 1966).

The use of holographic techniques which has received much attention is in pattern recognition systems. Such a system is described in an article entitled "Signal Detection By Complex Spatial Filtering" by A. Vander Lugt, IEEE TRANSACTIONS ON INFORMATION THEORY, Vol. IT-10, page 139 (April, 1964). In Vander Lugt's system, coherent light which has been diffracted by a specific object, such as a phototransparency, is focused by a transform lens and caused to interfere with light from a mutually coherent reference beam. A permanent record hologram is made of the resulting interference fringes. The hologram can be used at some later time to identify light in a signal beam that has been diffracted by the same or a similar pattern. To accomplish this result, that hologram is used as a filter in the signal beam. When the signal contains the same pattern as that used to generate the filter, the phase and amplitude of the beam passed by the filter will exceed some threshold level and an appropriate output is generated.

The matched filter holographic technique may be applied to pattern recognition in such diverse areas as fingerprint comparison, alpha-numeric character recognition, and recognition of images of airplanes, buildings, clouds or other objects included in aerial photographs.

The transform hologram or holographic filter may be used in apparatus wherein a photo transparency to be examined is illuminated by coherent light which is projected therethrough. The light passing through the transparency is focused by a transform lens to produce the Fourier transform of the two dimensional image on transparency. The hologram or filter is located in the transform plane. Light projected through the transparency and the transform lens is next projected through the hologram after which it is inverse-transformed to the output plane. A spot in the output plane is a cross-correlation of the pattern on the transparency and the pattern of the hologram. If the transparency contains the same pattern as that used to generate the filter, and if the mutual angular orientation is correct, the spot will be brighter than a threshold level. However, if the phase is not correct, the intensity of the light passing through the reference hologram remains below the threshold level.

The bandwidth and hence the detection efficiency of holographic matched filters depends on the ratio of the signal and reference beams used to create the filters. It has been the practice heretofore to use trial and error in making holographic filters: large numbers of filters are made with varying beam ratios and a near optimum ratio is determined by actually measuring the detection efficiencies. This is a tedious, time-consuming and inefficient process, requiring that the operator have a thorough understanding of the filter-making process. The optimum beam ratio can, however, be determined from measurements of the energy distribution in the diffraction pattern of the signal beam.

It is an object of this invention to provide an automated system for controlling the signal beam to reference beam ratio during the preparation of holographic filters for use in pattern recognition apparatus.

A further object of the invention is to control the exposure of the photosensitive medium used to record the hologram in the transform plane, so that proper exposures are obtained as the beam intensity is changed to maintain the desired beam ratio.

In accordance with the present invention, apparatus is provided for recording holograms on a photosensitive medium. The apparatus includes means for measuring the intensity of a signal beam in terms of spatial frequency and means for measuring the intensity of a reference beam. Apparatus is provided for comparing the intensities of the signal and reference beams and means is provided for maintaining the intensity of the signal and reference beams in a predetermined relationship to each other.

Figure 1:
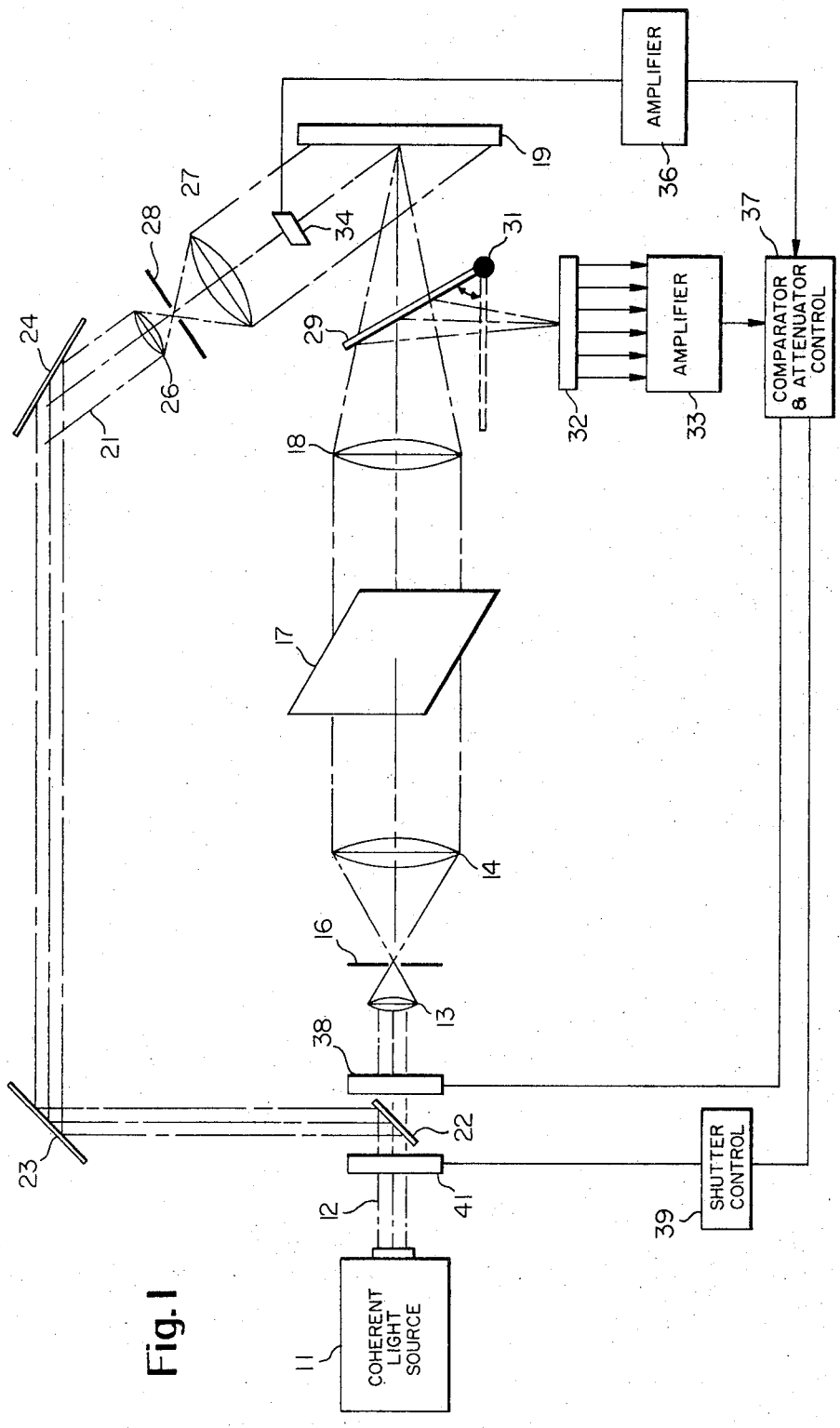
FIG. 1 is a diagram of a system embodying the invention.

In the system illustrated in FIG. 1, a coherent light source 11, such as a laser, generates a beam 12 which typically has a small diameter on the order of a few millimeters. Because of the small size of the beam, and the generally larger size of the objects to be illuminated, a beam expander comprising lenses 13 and 14 is included in the system. Lens 13 focuses beam 12 into a spot image of source 11 surrounded by stray energy, such as a series of spots of lesser brightness. In order to limit the expanded beam to the on-axis light, an aperture 16 is placed at the focal point of lens 13. Light passing through aperture 16 radiates as from a point source, expands to the desired beam size and is collimated by lens 14.

The collimated beam illuminates an object or pattern for which a holographic filter is to be produced. In the apparatus depicted in FIG. 1, the object is a transparency 17, such as a photographic transparency. Light passing through transparency 17 is diffracted by the image thereon and may be focused by a transform lens 18 into a transform plane 19 to produce a diffraction pattern characteristic of the object 17. The diffraction pattern is symmetric about a center point and generally comprises a bright central spot surrounded by regions of light of various brightness. The pattern is the Fourier transform of the two dimensional image on the transparency.

To form the pattern which will be recorded as the filter or hologram, a mutually coherent light beam 21 is directed onto plane 19 at a non-normal angle of incidence. Beam 21 is phase matched to beam 12 and is derived from the same source 11 by suitable apparatus such as a beam splitter employing a semitransparent reflector 22 which reflects a portion of beam 12 via reflectors 23 and 24 to a converging lens 26 and a collimating lens 27. Lenses 26 and 27, in conjunction with field filtering aperture 28 act as a beam expander in the manner already described with reference to lenses 13, 14 and aperture 16. Their function is to enlarge beam 21 to the extent required to illuminate the desired area of plane 19.

Figure 4:
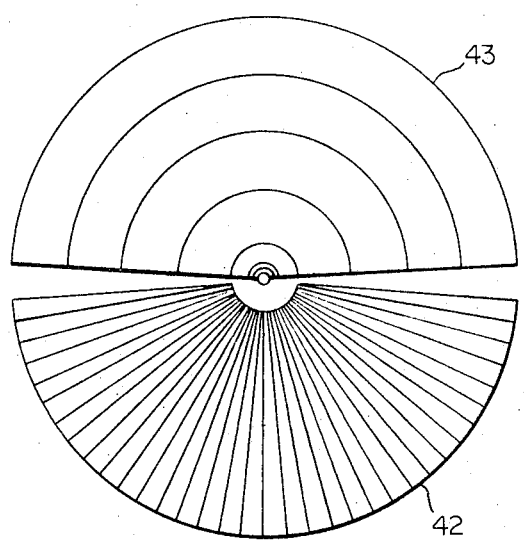
FIG. 4 depicts a detector array useful in conjunction with the invention.

According to the invention, a reflector 29 is positioned in the path of the portion of beam 12 which has passed through object 17 and lens 18. This portion of the beam is referred to as the signal beam. Reflector 29 is movable as on a hinge 31, from its position in the signal beam when beam ratio measurements are being made, as shown by the solid outline, to a position out of the signal beam, when the hologram is being recorded, as indicated by the dashed outline. When reflector 29 is positioned as shown by the solid outline, the signal beam is focused on a detector 32 adapted to detect the light energy in a selected portion of the diffraction pattern. Detector 32 may be of the type disclosed in co-pending application Ser. No. 172,629, filed Aug. 16, 1971 now U.S. Pat. No. 3,689,772 issued Sept. 5, 1972, by Nicholas George, James Thomasson and Abraham Spindel. Such a detector comprises an array of photosensitive elements in a pattern as illustrated in FIG. 4. The outputs of the ring elements of detector array 32 are amplified in an amplifier 33 which produces an output signal representative of the intensity of the portion of the diffraction pattern selected for monitoring purposes.

The intensity of the reference beam is measured by a single element detector 34 located in the expanded portion of beam 21, which may be designated the reference beam. The output of detector 34 is amplified by amplifier 36.

The output signals of amplifiers 33 and 36 are fed to a comparator and attenuator control 37, which measures the ratio of the detected intensities of the signal and reference beams, and develops an output signal representative of the difference between a predetermined ratio and the detected ratio. The output of comparator-attenuator control 37 controls a variable light beam attenuator 38 located in the reference beam path or in the signal beam path. Attenuator 38 may be of the type disclosed in co-pending patent application Ser. No. 169,202, filed Aug. 5, 1971, by Abraham Spindel and James F. Maas.

Comparator-attenuator control 37 may also generate an auxiliary output representative of the intensity of the signal beam. This auxiliary output will change with changes in beam intensity produced by attenuator 38 and may be used to drive a shutter control 39 which regulates a shutter 41 located in the path of beam 12. Thus, the exposure of the photographic recording medium in plane 19 is maintained in the proper range as the signal beam intensity is adjusted by attenuator 38.

Circuits for performing the function of comparator attenuator control 37 are known in the art and need not be described herein.

Figure 2:
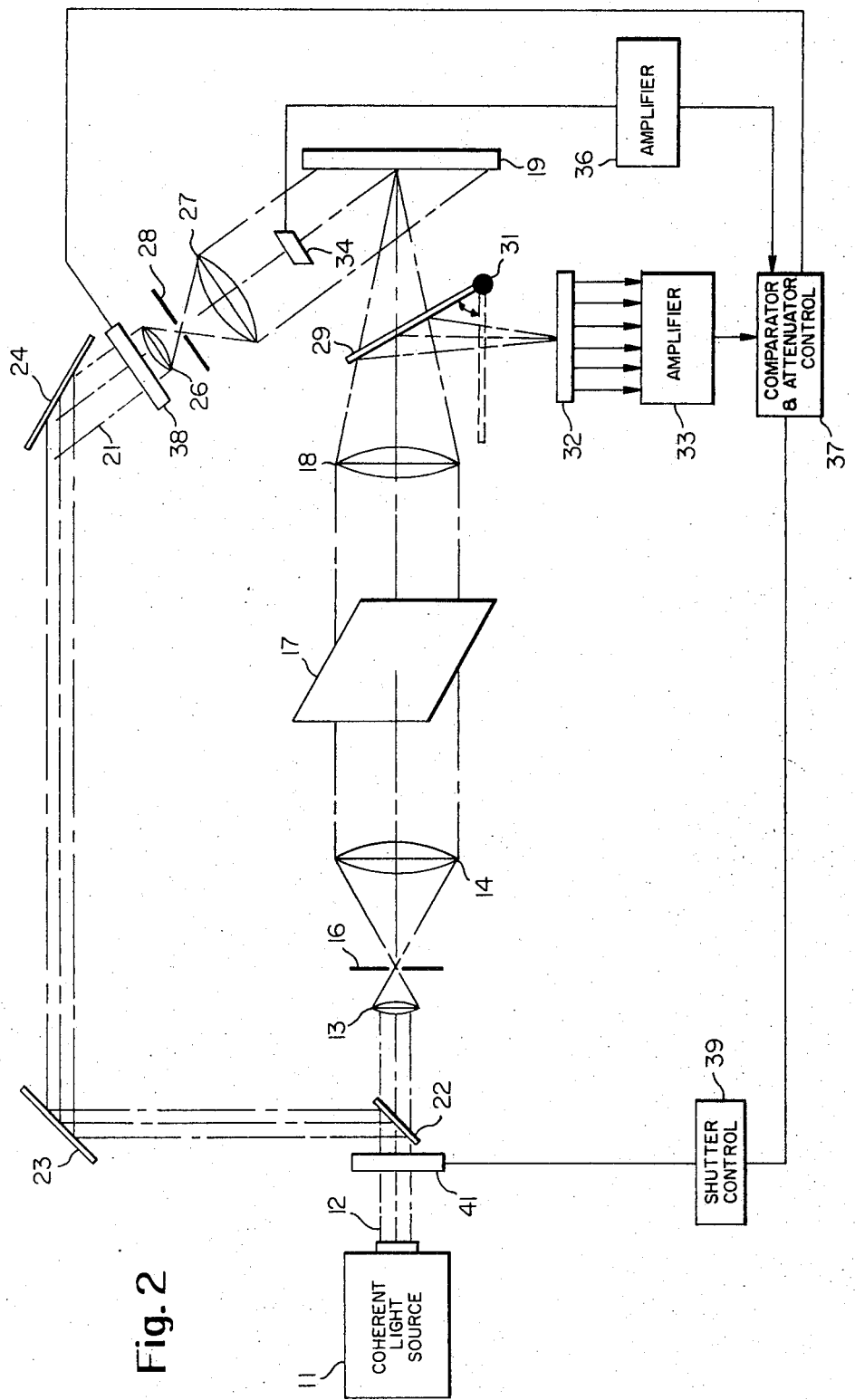
FIG. 2 is a diagram of an alternative embodiment of the invention.

In the embodiment illustrated in FIG. 1, attenuator 38 is located in the path of the signal beam. However, it may be more desirable to locate the attenuator in the reference beam, an arrangement of which is illustrated in FIG. 2. In the embodiment of FIG. 2, the shutter control 39 is responsive to changes in the intensity of the reference beam.

Figure 3A:
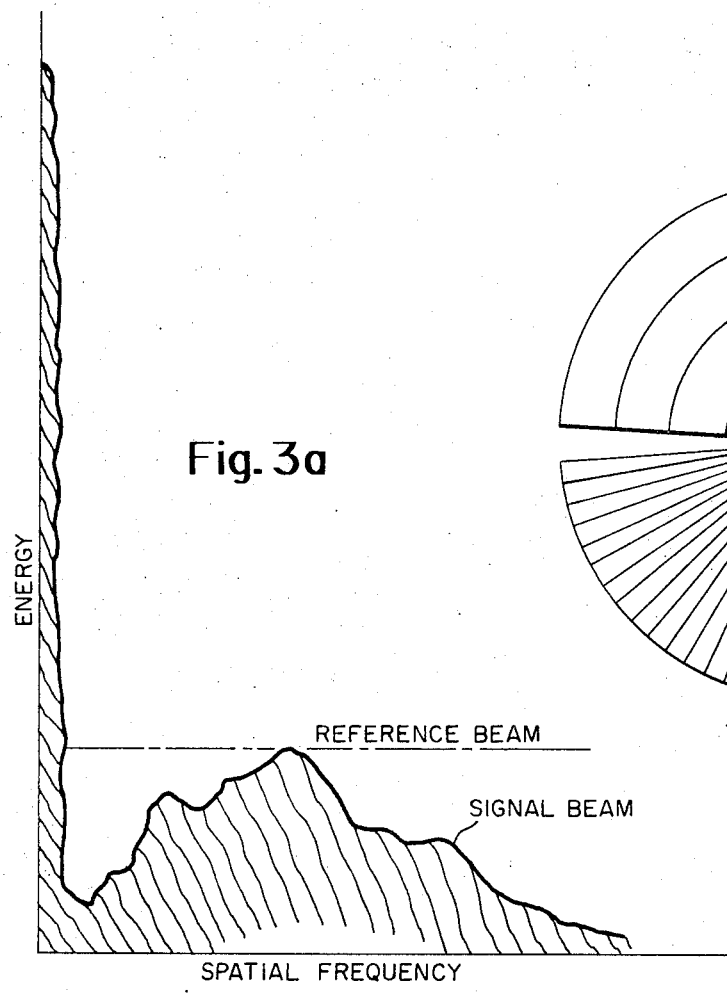
FIGS. 3a and 3b depict the distribution of energy in the diffraction pattern of two different objects and are helpful in understanding the invention.
Figure 3B:
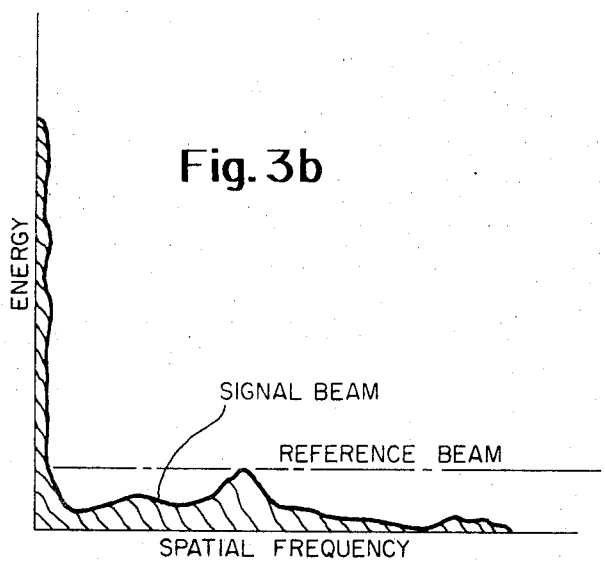

The application of the invention to pattern recognition may be more clearly understood by referring to FIGS. 3a and 3b, which are graphs representative of the average energy distribution along the cross-sectional radius of the diffraction patterns of two distinct patterns for which holographic filters are to be made. It has been found that the detection efficiency of holographic filters may, in some cases, be optimized when the filter is photographically recorded with a reference beam of substantially the same intensity as the brightest portion of the diffraction pattern outside of the center spot. (Other types of patterns may be characterized by different optimum beam ratios, however). The invention may be utilized in preparing a series of filters using the same predetermined beam ratio. Thus, the near optimum beam ratio may be determined by a skilled operator for various types of patterns. Un-skilled personnel may then use the invention by setting the system to the ratio predetermined to be appropriate for the class of pattern for which filters are to be made.

The special detector illustrated in FIG. 4 and disclosed in the reference co-pending application of Nicholas George, James Thomasson and Abraham Spindel, comprises two semi-circular detector arrays. Array 42 consists of a plurality of radial sectors, while array 43 consists of a plurality of semi-rings. All of the detectors in the arrays are independent. Because of the symmetry about the center point characteristic of diffraction patterns, any semicircular portion of the pattern contains all of the features of the entire pattern. Thus, the rings on the special detector are able to sense the light in any selected portion of the pattern fixed in a polar frame of reference by angle and radius.

Although the invention is described herein with reference to specific illustrative embodiments, those skilled in the art to which it pertains will recognize many variations and modifications which are possible and may be made without departing from its scope and spirit.

What is claimed is:

1. A system for producing holographic filters comprising:
   a coherent light beam source;
   means for directing the beam from the source to illuminate an object for diffraction thereby in a signal beam;
   means for focusing the light diffracted by the object so as to form the optical Fourier transform of the object at a transform plane;
   means for directing a coherent reference light beam onto the transform plane at a non-normal angle of incidence;
   means for separately measuring the intensity of the signal beam light forming said optical Fourier transform of the object at a multiplicity of distinct spatial frequencies;
   means for measuring the intensity of the reference beam;
   means for comparing the measured intensities of the signal and reference beams; and means, responsive to the output of said means for comparing the measured intensities, for maintaining the beam intensities at a value such that the reference beam has an intensity substantially equal to the highest intensity measured for any spatial frequency in the signal beam other than the spatial frequencies near the zero spatial frequency.

* * * * *